(12) United States Patent
Hargreaves (10) Patent No.: US 8,322,011 B2
(45) Date of Patent: Dec. 4, 2012

(54) HORTICULTURE LIGHT FIXTURE HAVING INTEGRATED LAMP AND BALLAST

(75) Inventor: Craig Hargreaves, Vancouver, WA (US)

(73) Assignee: IP Holdings, LLC, Vancouver, WA (US)

( * ) Notice: Subject to any disclaimer, the term of this patent is extended or adjusted under 35 U.S.C. 154(b) by 479 days.

(21) Appl. No.: 12/660,129

(22) Filed: Feb. 22, 2010

(65) Prior Publication Data

US 2011/0203096 A1 Aug. 25, 2011

(51) Int. Cl.
*B23P 11/00* (2006.01)
*F21V 29/00* (2006.01)

(52) U.S. Cl. .......... 29/428; 362/373; 362/805; 362/264; 362/294

(58) Field of Classification Search ................... 29/428; 362/294, 264, 265, 373, 805
See application file for complete search history.

(56) References Cited

U.S. PATENT DOCUMENTS

| | | | | |
|---|---|---|---|---|
| 4,078,169 | A * | 3/1978 | Armstrong | 362/122 |
| 6,595,662 | B2 * | 7/2003 | Wardenburg | 362/362 |
| 7,083,309 | B2 * | 8/2006 | Chan et al. | 362/429 |
| 7,524,090 | B2 | 4/2009 | Hargreaves | |
| 7,534,011 | B2 * | 5/2009 | Townsley | 362/294 |
| 7,972,044 | B2 * | 7/2011 | Burkhauser | 362/373 |
| 7,982,376 | B2 * | 7/2011 | Keen et al. | 313/35 |
| 2006/0055293 | A1 | 3/2006 | Ngai | |
| 2008/0117617 | A1 * | 5/2008 | Hargreaves et al. | 362/1 |
| 2008/0205071 | A1 | 8/2008 | Townsley | |
| 2011/0183308 | A1 * | 7/2011 | Hsu et al. | 434/258 |

* cited by examiner

*Primary Examiner* — Essama Omgba
(74) *Attorney, Agent, or Firm* — Robert J. Ireland (57) ABSTRACT

A method for integrating at least one very high output (VHO) fluorescent lamp and at least one ballast within at least one fluorescent lamp fixture sealed from the growing environment is disclosed. The at least one ballast is secured within an upper fixture structure between a first cooling duct and a second cooling duct. At least one mid-plate reflector is mounted within the at least one upper fixture structure enclosing the at least one ballast thereby defining an upper chamber and a lower chamber. The at least one fluorescent lamp is installed in the lower chamber that is sealed from the growing environment by a transparent glass sheet, mounted to either or both the endplates or upper fixture structure. At least one fan is installed to the first cooling duct or the second cooling duct to provide the forced air cooling. The mid-plate reflector benefits from openings above the lamp location thereby providing a vent for heated air around the fluorescent lamp to rise up, away from the lamp, and out into the upper chamber where it is exhausted. The mid-plate reflector further benefits from being solid above the lamp ends or electrodes thereby retaining heat and improving lamp performance. At least one baffle located within the upper chamber directs cooling air provided by the fans through the mid-plate reflector to better cool the lamp, around the ballast to improve ballast cooling characteristics, or both.

8 Claims, 6 Drawing Sheets

HORTICULTURE LIGHT FIXTURE HAVING INTEGRATED LAMP AND BALLAST

BACKGROUND OF THE INVENTION

1. Technical Field of the Invention

The present invention relates in general to horticultural and agricultural lighting systems used in developing and growing plants in controlled environments. More specifically, the present invention relates to a horticulture light fixture having an integrated very high output (VHO) fluorescent lamp and ballast.

2. Description of the Related Art

Indoor gardens, green houses, hydroponics systems, and isolated carbon dioxide growing chambers all require light to grow plants. Currently, the most common grow-light source is HID (High Intensity Discharge) lamps constructed from high pressure sodium and metal halide technologies. The HID lamps have been a mainstay in the indoor gardening market for over 20 years, but technology advancements in fluorescent lamps and the ballasts that power the same now produce efficient lumens in adequate quantity to viably grow plants that before only could be grown by HID lamps at much lower power efficiencies.

Attenuation of light is a major issue faced by plant growers around the world. Plant growers prefer to position the light fixture close and above the growing plants in order to limit the effects of attenuation. Attenuation is the gradual loss in intensity of any kind of flux through a medium. For instance, sunlight is attenuated by atmosphere, and X-rays are attenuated by lead. In either example, the "distance" the flux must travel through the medium directly impacts the loss of intensity. Therefore it follows that the greater the distance between the lamp and the plants, the more lumens lost in the atmosphere in between. In short, the user of a grow light fixture desires a location of the fixture as close to the plants as possible, without causing heat impact on the plants that will stunt development, cause curl, or kill the plant.

Heat produced by the light fixture is always a design challenge and concern. The HID lamps by consequence of high lumen output with low power efficiencies produce undesirable amounts of heat. The thermal pollution or heat generated must then be isolated and removed from the growing environment. In order to combat the negative effects of heat, light fixtures with various active cooling systems were developed. These cooling systems rely upon a fan or fans, pushing or pulling isolated cooling atmosphere through the fixture, and the heated atmosphere out of the fixture away from plants. [See U.S. Application 2008/025071 Townsley] The fixture may be placed close to growing plants without worry of plant harm due to excessive temperatures.

Many attempts have been made for manufacturing grow light fixtures adapted for combating the negative effects of heat, while still benefitting from the simplicity of having the ballast integrated within the light fixture. [See U.S. Pat. No. 7,524,090 Hargreaves] Integrating a ballast within the fixture for easy install has been accomplished for HID by force cooling fans, and isolating the ballast with an air gap. Fluorescents up until recently, did not produce the quantity of lumens required to grow plants through the flowing and fruiting phase, leaving HID lamps as the first choice as a yield grow light. Also, the lower lumen output T-5 lamps did not generate enough heat to cause premature failure of the ballast when integrated within the fixture, so passive cooling with vents was enough. The new and recently developed higher lumen output linear T-5 lamps referred to as Very High Output (VHO) creates new design challenges in integrating the ballast within the fixture. The VHO lamps show potential to replace the HID lamps as the standard for the industry.

HID has been the market standard for high lumen output for yielding plants, and the forced air cooling feature is well known in this art. Fluorescents have been a market standard for starting plants or developing plants, leaving the flowering and fruiting yields to the HID. Prior to reaching new levels of lumen output, most fluorescent fixtures were passively cooled, and the ballast for powering the fluorescent lamps were in most applications easily located within the fixture without concern of premature failure due to heat soaking. With the new VHO lamp development, the VHO fluorescent lamps can produce lumens in quantity matching HIDs, at a greater lumen per electrical watt efficiency. This new VHO increase in lumen power, comes substantial heat production increase, and thermal problems when attempting to integrate the ballast within the fixture.

To further compound the issue, the power requirements of the VHO lamp is more than the old fluorescent T-5 lamp, thereby requiring more power from the ballast, thereby increasing the heat generated by the ballast. The increase lamp temperatures coupled with the increased ballast temperatures require a fan or forced air cooling system to remove the excess heat. But just removing the heat is not enough, the fluorescent lamps benefit from a cooled center section, while further benefitting from warmer lamp ends. In short, the fixture must be forced air cooled, each lamp cooled in the middle, kept heated on the ends, the heat sealed from the growing environment while maintaining the ballast within operating temperatures.

Fluorescent lamps, especially the smaller T-5 tubes such as the VHO lamps, require optimum temperatures in order to produce maximum lumens, and operate at maximum life expectancy. Lumen output depends on two variable temperatures, a first temperature immediately around the body of the linear lamp, and a "cold" spot temperature of the lamp at the electrodes or ends. A first temperature around 95 degrees Fahrenheit maximizes lumen production of the T-5 bulb. However, the ends or cold spots located around the electrode require a higher temperature, around 110 to 115 degrees Fahrenheit for maximum performance. Not only do the lamps need to be cooled in the middle, along body of the lamp, but the ends or electrodes require increased temperatures in order to perform optimally.

Some other light fixtures utilize simple methods to raise the temperature of the cold spots on fluorescent bulbs involving cylindrical sleeves attached around the ends or electrodes covering the cold spots. [See U.S. Patent Application 2006/0055293 Ngai] The method of sleeving or insulating the lamp ends require additional hardware and maintenance. Each time a lamp is replaced, a sleeve must be installed increasing expense and complexity.

The new VHO lamps require a fixture able to maximize performance of the lamps by regulating their temperature, while preventing premature thermal failure of the ballast.

SUMMARY OF THE INVENTION

To minimize the limitations found in the prior art, and to minimize other limitations that will be apparent upon the reading of the specifications, the present invention provides a method for integrating very high output (VHO) fluorescent lamps and ballast within a grow lamp fixture benefitting from forced air cooling. The ballast is secured within an upper fixture structure between a first cooling duct and a second cooling duct. The fixation to the upper structure may be further enhanced with heat conducting medium or grease between the ballast and upper fixture structure. At least one mid-plate reflector is mounted within an upper fixture structure enclosing the ballast thereby defining an upper chamber and a lower chamber. The first and second cooling ducts are in flow communication through the upper chamber. The fluorescent lamps are located within the lower chamber. In the preferred embodiment, the at least one mid-plate reflector has a plurality of longitudinal slot openings above the lamp body, allowing air flow communication between the lower chamber and the upper chamber. The slot openings are of adequate size to allow heated air created by the fluorescent lamp to rise through the mid-plate reflector and into the upper chamber where it is exhausted. At least one transparent glass sheet is sealingly mounted to the lower fixture structure enclosing the at least one fluorescent lamp. Forced air cooling is performed by at least one fan installed to either the first or second cooling duct, or if multiple fans are used to both.

To further enhance VHO lamp performance, a method for increasing the temperature of the cold spots at the lamp ends or electrodes employed wherein the mid-plate reflector is left solid above the lamp ends or electrodes. Practice teaches that having the mid-plate reflector solid over the lamp end or electrode while having slot openings over the remainder of the lamp helps keep the lamp body at optimum temperatures, while increasing the temperature at the lamp end or electrode. The number of lamps, the forced cooling air volume and temperature, the type of ballast, all play factors in determining how much of the mid-plate reflector is kept solid, and how much is punched out with openings. Practice teaches that leaving 1.0 to 3.0 inches solid at the ends of the mid-plate reflector is enough to increase the temperature to optimum levels at the lamp ends or electrodes under most circumstances.

To further control the operating temperature at the ballast, lamp body, and the lamp ends or electrodes, a baffle is located within the upper chamber. There can be more than one baffle, depending on desired temperatures. The baffle is positioned and located to force more cooling air to the location where temperature decrease is desired. If the lamp body is running above optimum temperatures, the baffle is shaped and formed to redirect the cooling air flowing through the upper chamber, and located to direct more of the cooling air stream through the openings in the reflector, thereby increasing cooling potential at the lamp. If the ballast is suffering from premature failure, the baffle may be positioned to force more cooling air around the ballast thereby isolating the ballast from the heated air rising off of the lamp or lamps.

OBJECTS AND ADVANTAGES

The primary object of the invention is to provide the first grow light fixture that successfully utilizes the new VHO lamp technology.

One object of the invention is to provide an easy to install horticulture light fixture having integrated at least one very high output (VHO) fluorescent lamp and at least one ballast into a single fixture.

Another advantage of the invention is to provide a horticulture light fixture that is constructed and arranged whereby the at least one ballast is maintained at optimum temperatures.

Another objective of the invention is to provide a horticulture light fixture utilizing at least one fan to push or pull cooling air through the at least one fixture thereby maintaining performance temperatures at the fluorescent lamp and ballast. The fan or fans may either be located at the first or second cooling duct, or both.

Another objective of the invention is to provide a horticulture light fixture that isolates the heated atmosphere from the growing environment.

Yet another objective of the invention is to provide a horticulture light fixture including at least one baffle for controlling the velocity and direction of the cooling atmosphere within the fixture, thereby maintaining desired performance temperatures of the lamp, lamp body, and lamp ends or electrodes.

Yet another advantage of the invention is to provide a horticulture light fixture that does not require an internally sealed wall that controls the cooling air, and instead relies upon a baffle that allows cooling air to pass around and by thereby providing a controlled cooling of the ballast and controlled cooling of the lamp.

A further object of the invention is to provide a horticulture light fixture having a mid-plate reflector that benefits from a plurality of longitudinal slots running parallel and above the at least one fluorescent lamp whereby the plurality of longitudinal slots provide cooling to the center body of the lamp.

A further advantage of the invention is to provide a horticulture light fixture having a mid-plate reflector that benefits from being solid without slots above the lamp end or electrodes, thereby retaining the heated air around the lamp ends or electrodes of the fluorescent lamp.

The final object of the invention is to provide a grow light fixture utilizing new fluorescent technologies having a greater lumen per electrical watt efficiency than standard HID lamps.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
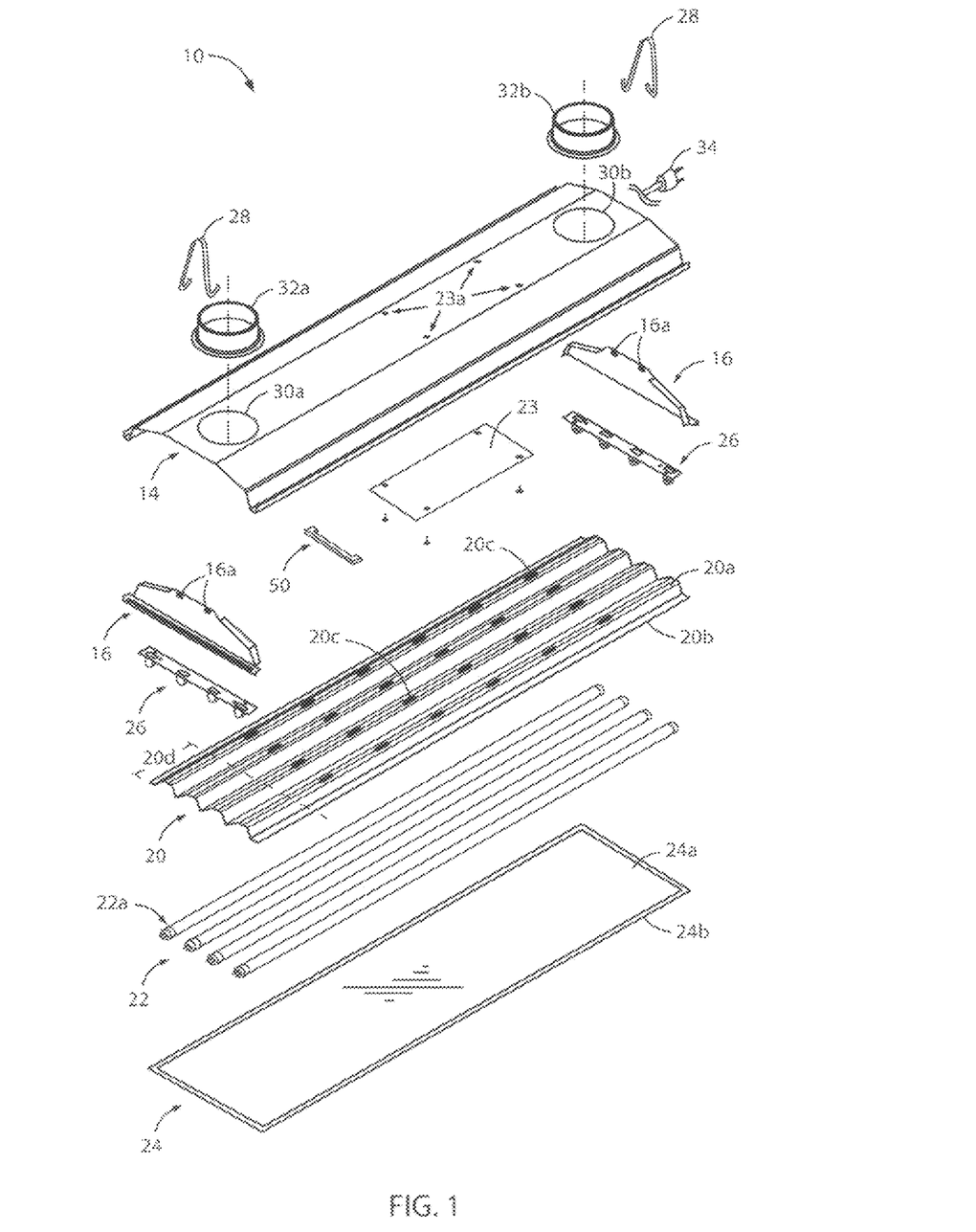
FIG. 1 is an exploded view of a horticulture light fixture having at least one integrated very high output (VHO) fluorescent lamp and at least one ballast.

FIG. 1 is an exploded view of the preferred embodiment of a horticulture light fixture 10 having integrated very high output (VHO) fluorescent lamp 22 and at least one ballast 23. A method for integrating the at least one ballast 23 within the at least one very high output (VHO) fluorescent lamp fixture 10 includes securing the at least one ballast 23 to the upper structure 14 at securing through holes 23a, between a first cooling duct 32a located through upper structure 14 at first hole 30a, and a second cooling duct 32b located through the upper structure 14 at second hole 30b. Mounting the mid-plate reflector 20 to the upper structure 14, via end plates 16 thereby defining a floor of an upper chamber 20a and a ceiling of a lower chamber 20b. The end plates 16 having through holes 16a further work in mechanical communication with hangers 28 for easy vertical securing. Installing at least one fluorescent lamp 22 in the lower chamber 20b secured in lamp sockets 26 and finally sealing the growing environment 24b from the at least one lamp 22 by defining the floor of the lower chamber 24a and the growing environment 24b, by sealingly securing at least one transparent glass sheet 24 to the end plates 16, or the upper structure 14, or in securing combination to both the end plates 16 and the upper structure 14.

Figure 2:
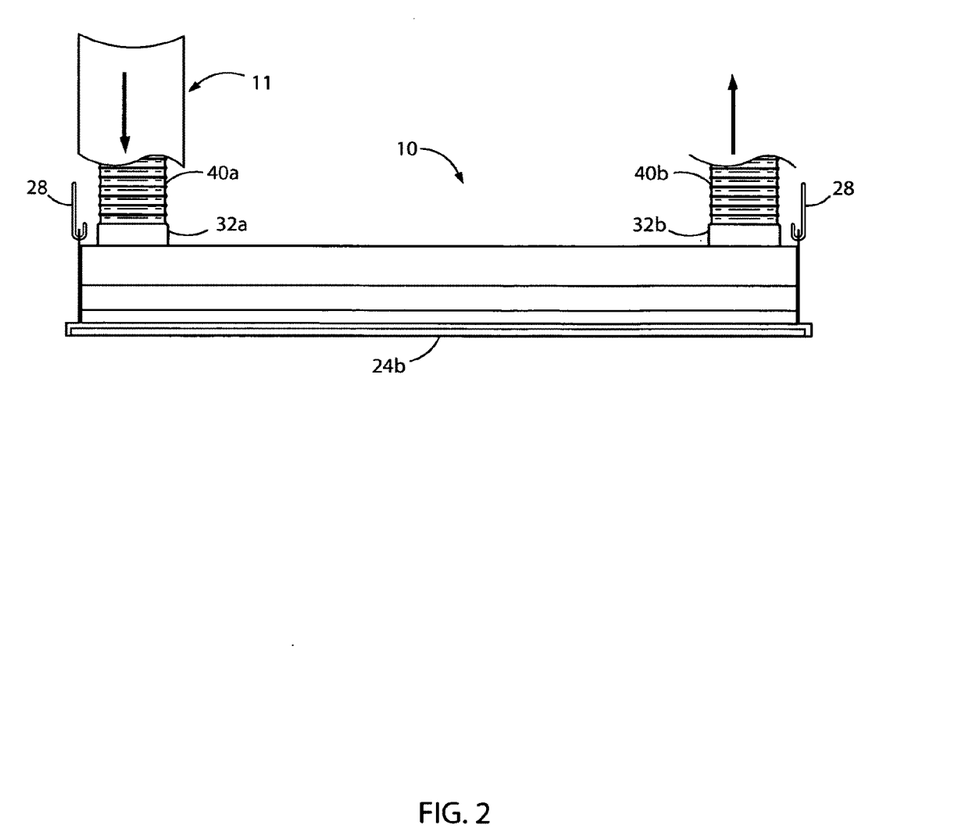
FIG. 2 is a front perspective view of the horticulture light fixture having at least one integrated very high output (VHO) fluorescent lamp and at least one ballast as shown in FIG. 1.

One skilled in the art understands the common electrical connections required in bringing in power 34 into the fixture, to the ballast 23, the fan 11 in FIG. 2., to the lamp sockets 26, finally to the lamp 22.

The preferred method includes a plurality of openings that in FIG. 1. are longitudinal slots 20c through the mid-plate reflector 20 running parallel with the lamp 22. The plurality of longitudinal slots 20c have adequate size to allow the heated air created by the lamp 22 to rise through the mid-plate reflector 20 and into the upper chamber 20a where it is exhausted out. The openings or longitudinal slots 20c allow flow communication between the upper chamber 20a and the lower chamber 20b.

As shown in FIG. 1. The longitudinal slots 20c are not located above the lamp ends or electrodes 22a in the shown embodiment. The method teaches a solution to cold spots at the end of the lamps by creating heat retention around the lamp ends or electrodes 22a. Without a longitudinal slot 20c above the lamp end or electrode 22a, the heated air has no opening to rise up and through the mid-plate reflector 20 and into the upper chamber 20a. The desired temperature for the lamp end or electrode 22a, can be regulated by the location, size, solid portion 20d, and quantity of longitudinal slots 20c. The solid portion 20d is located above the lamp end or electrode 22a thereby increasing the operating temperature and helping performance. The size of the solid portion 20d is tuned or changed to match the temperature requirements at the end of the lamp or electrode 22a. For example, a four VHO lamp fixture would require less solid portion 20d then a two VHO lamp fixture as there is more heat generated and retained in the lower chamber if the forced cooling air system was the same. In colder applications the solid portion 20d is increased, in warmer applications it is decreased.

The location of a baffle 50 is also important to cooling within the fixture. The baffle 50 can be sized and positioned to maximize the cooling effects within the fixture 10. The baffle 50 can be shaped, formed, and located to force more cooling air through the mid-plate reflector 20 thereby decreasing the temperature of the lamp 22. The advantage of having the longitudinal slots 20c only over the lamp 22 potion that requires additional cooling centers on the baffle 50 being able to direct more air through the longitudinal slots 20c while avoiding an increase of cooling air directed at the lamp end or electrode 22a. Keeping the ends of the lamp 22a heated to optimal performance while still being able to cool the center of the lamp 22 to enhance longevity and lumen output is a difficult thermal management challenge made simple by longitudinal slots 20c. In applications where additional cooling at the center of the lamp 22 is required, the baffle 50 is added either one or a plurality, to direct the cooling air and control the temperature of the lamps 22. If the lamps 22 are operating at optimal temperatures without the need to direct additional cooling air, the baffle 50 may also be used to direct additional air at the ballast 23, or in instances where it is desirable to increase velocity while decreasing volume of flow, the baffle 50 can be used to regulate the cooling air flow characteristics within the fixture 10. The baffle 50 may be fixated to the mid-plate reflector 20 or upper fixture structure 14 with high heat adhesive, pop rivet, epoxy, or suitable double sided tape.

At least one baffle 50 may be integrated as a structural feature in the upper fixture structure 14, the ballast 23, or the mid-plate reflector 20. The different functional shapes, sizes, and mounting locations within the upper fixture structure 20a are as many as there are desired thermal conditions within the horticulture fixture 10.

As the preferred embodiment shows in FIG. 2., the first cooling duct 32a, upper chamber 20a, and second cooling duct 32b are all in air flow communication with the fan 11. The method benefits from forced air cooling having fan 11 increase air flow and pressure through conduit 40a, into and through first cooling duct 32a, into and through the horticulture light fixture 10 within the upper chamber 22a, but sealed away from the growing environment 24b by the glass sheet 24, exhausted through the second cooling duct 32b and out through second conduit 40b, from there the heated air can be exhausted into a desired location.

Figure 3:
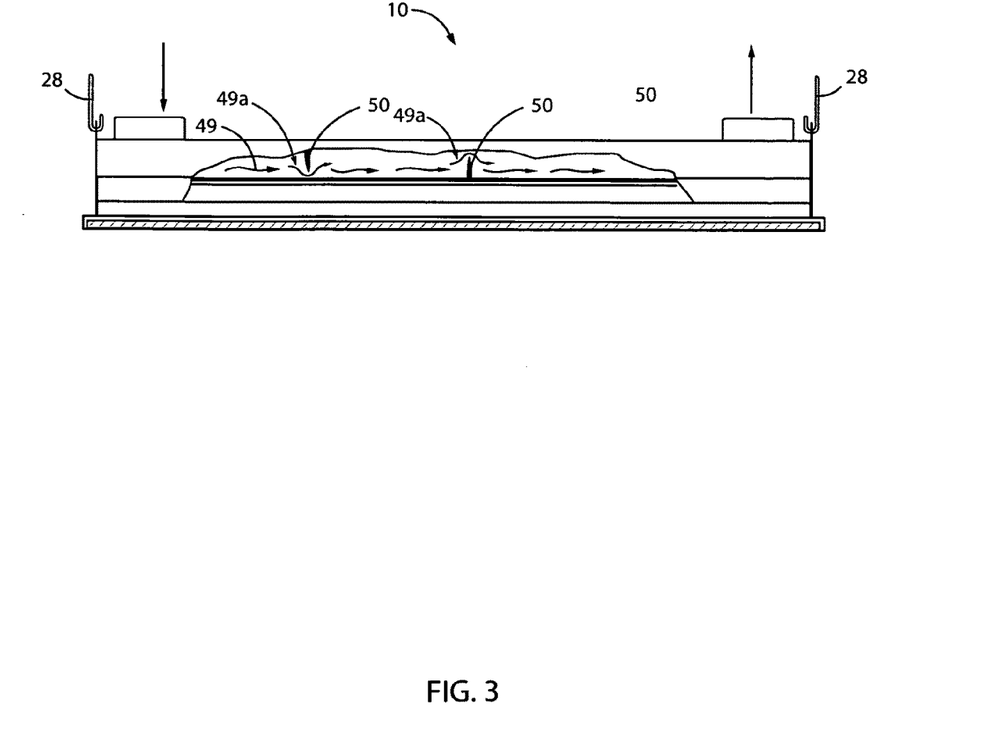
FIG. 3 is a cut-away view of the horticulture light fixture having integrated at least one very high output (VHO) fluorescent lamp and at least one ballast as shown in FIG. 1, illustrating an air path through at least one baffle designed for directing the air between at least one first cooling duct and at least one second cooling duct.

FIG. 3 shows the Horticulture Light Fixture 10 having a cut-away, with arrows depicting motion demonstrating internal air flow 49 that after impacting baffle 50, became disrupted air 49a having change in direction, velocity, or pressure from the initial air flow 49. Desired changes in cooling conditions of the horticultural light fixture 10 and it's internal components shown in FIG. 1, can be temperature tuned-in or maximized by making changes to baffle 50 configuration and location. One or more baffles 50 secured to the upper structure 14 or to the mid-plate reflector 20, installed within the internal air flow 49 within the upper chamber 20a may either force more cooling air through the longitudinal slots 20c thereby increasing cooling flow at the lamp 22, or force air up and at the upper structure 14 thereby increasing cooling flow at the ballast 23 shown in exploded view FIG. 1. The baffles' 50 size, quantity, shape, and location within the internal air flow 49 within the upper chamber 20a, all contribute in controlling the cooling characteristics of the device. If for example the ballast 23 is suffering from too high of operating temperature, then baffle 50 is installed to direct more cooling air at the ballast 23. In another example if the lamps 22 were operating over ideal temperatures then a large baffle 50 installed to direct more cooling air through the mid-plate reflector 20, even directing a majority of the cooling air through the mid-plate reflector 20 under the baffle 50 thereby decreasing temperatures at the lamps 22, and allowing the now heated air to pass through the mid-plate reflector 20 behind the baffle 50 and out the second cooling duct 32b. Many optional placements of baffles 50 within the internal air flow 49 are available to one of ordinary skill to maximize the performance of the Horticulture Light Fixture 10.

Figure 4:
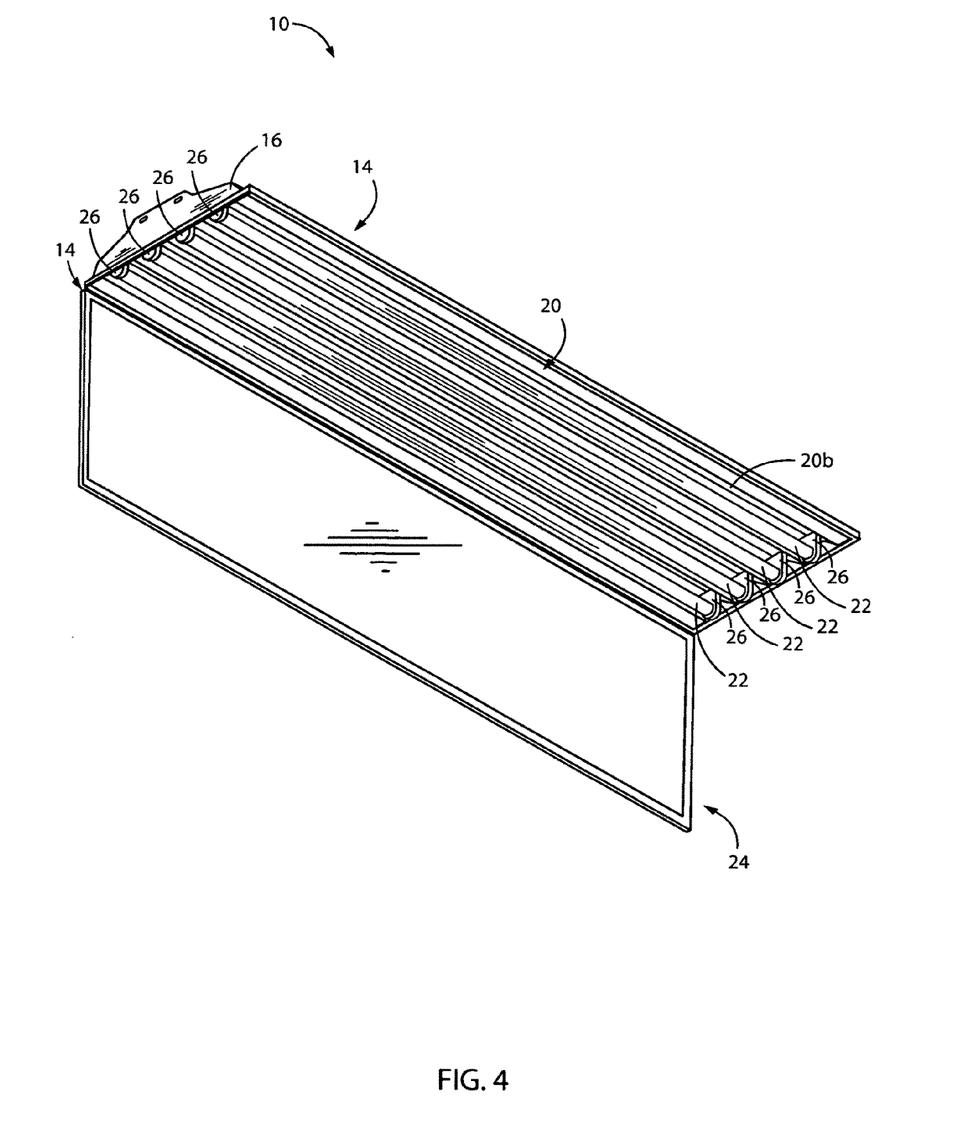
FIG. 4 is a perspective view of the horticulture light fixture having at least one integrated very high output (VHO) fluorescent lamp and ballast with the at least one transparent glass sheet open.

FIG. 4 is a perspective bottom view of the horticulture light fixture 10 with the transparent glass sheet 24 connected on one side to the upper structure 14. When in the closed position, the transparent glass sheet 24 defines the floor of the lower chamber 20b. The sockets 26 mount to the endplates 16 then the lamps 22 install into the sockets 26.

Figure 5:
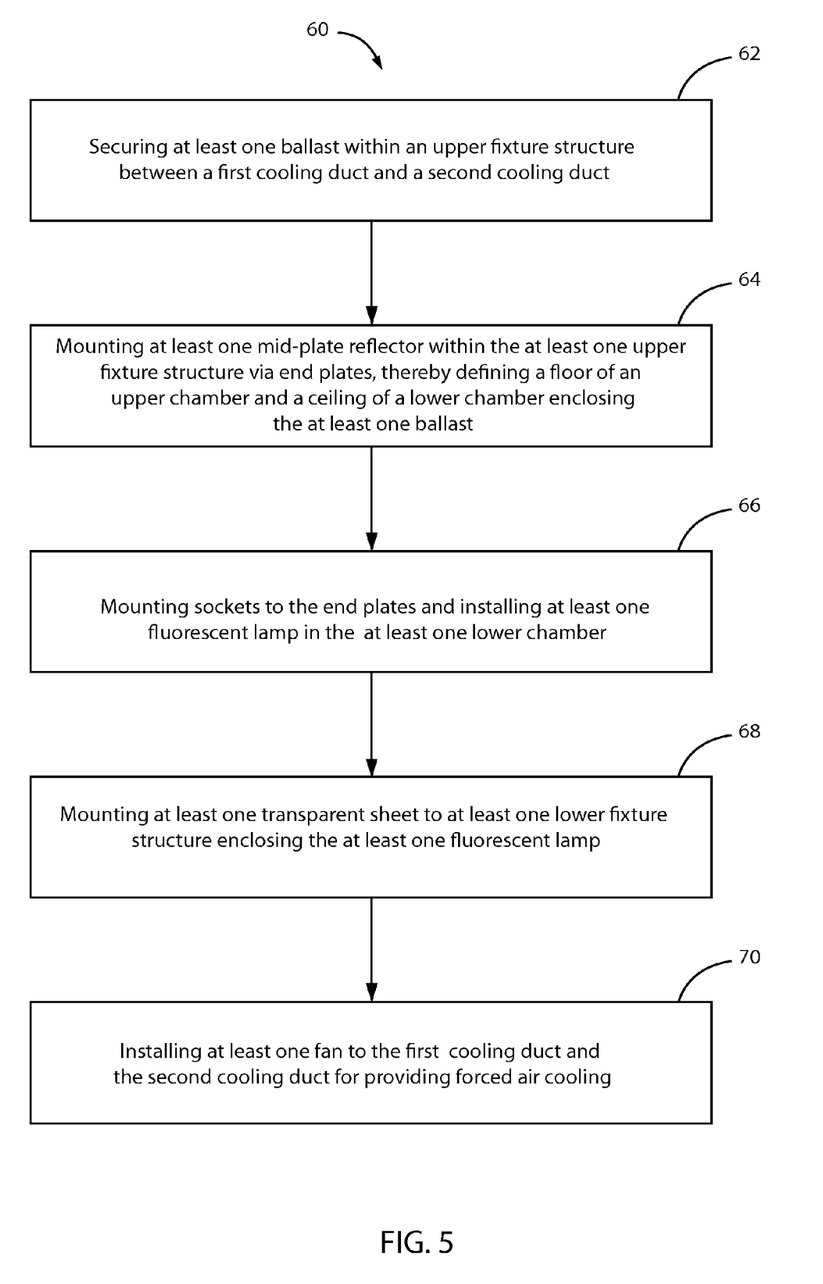
FIG. 5 is an operational flow chart of the present invention, illustrating a method for integrating at least one ballast within at least one very high output (VHO) fluorescent lamp fixture.

FIG. 5 shows an operational flow chart of a method for integrating at least one ballast within at least one very high output (VHO) fluorescent lamp fixture 60. The method is initiated as at block 62 by securing the at least one ballast within an upper fixture structure between a first cooling duct and a second cooling duct. The upper structure provides a secure location while having an added benefit of thermally heat sinking the ballast to the upper structure, thereby providing both conduction cooling and convection air cooling. Mounting at least one mid-plate reflector within the at least one upper fixture structure via endplates, thereby defining a floor of an upper chamber and a ceiling of a lower chamber 64, enclosing the at least one ballast.

Then, as shown at block 66, sockets are mounted to the endplates, and at least one fluorescent lamp is installed in the at least one lower chamber. Thereafter, at least one transparent glass sheet is sealingly mounted to at least one lower fixture structure enclosing the at least one fluorescent lamp as shown at block 68. Block 70 indicates installing at least one fan to the first cooling duct in flow communication with the second cooling duct.

Figure 6:
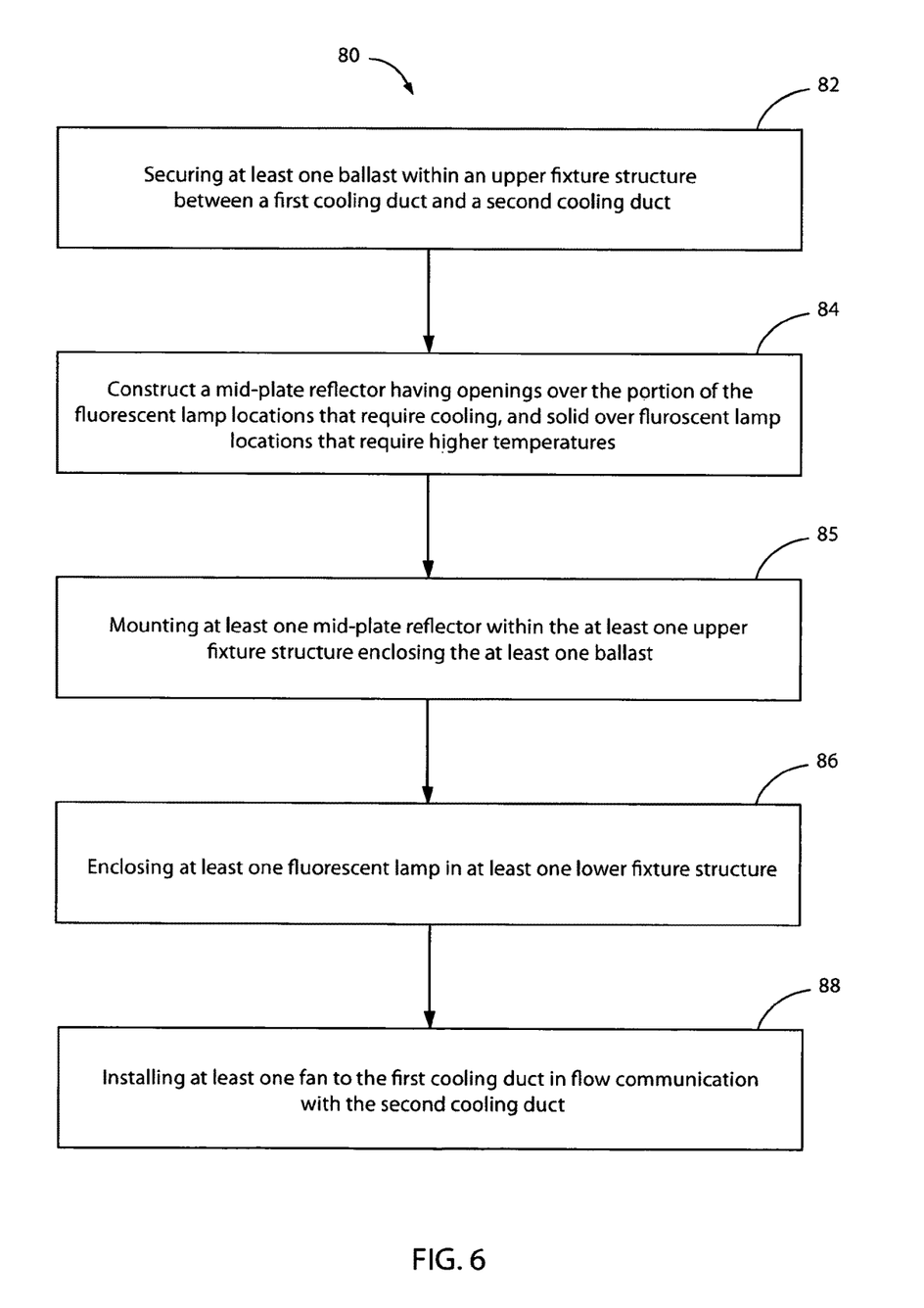
FIG. 6 is an operational flow chart of the present invention, illustrating a method for integrating the at least one ballast within the at least one fluorescent lamp fixture having a plurality of cold spots at a first end and a second end of at least one fluorescent lamp and a plurality of hot spots at a lamp body.

FIG. 6 shows an operational flow chart of a method for integrating the at least one ballast within the at least one fluorescent lamp fixture having a plurality of cold spots at a first end and a second end of at least one fluorescent lamp and a plurality of hot spots at a lamp body 80. The method is initiated by securing at least one ballast within at least one upper fixture structure between a first cooling duct and a second cooling duct as shown in block 82. Looking to block 84, construction of a mid-plate reflector having openings over the portion of the fluorescent lamp locations that require cooling, and solid over fluorescent lamp locations that require higher temperatures. Then, mounting at least one mid-plate reflector within the at least one upper fixture structure enclosing the at least one ballast as shown at block 85. As shown at block 86, the fluorescent lamps are enclosed in the lower fixture structure sealed from the growing environment via glass sheet or other transparent sheet. Finally, as shown in block 88, at least one fan may be installed to the first cooling duct in flow communication with the second cooling duct.

While the present invention has been described in terms of specific embodiments, it is to be understood that the invention is not limited to the embodiments set forth herein. The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for integrating at least one ballast within a fluorescent lamp fixture that is sealed from the growing environment, comprising the steps of:
    a) forming an upper fixture structure defining the ceiling and sides of an upper chamber and the sides of a lower chamber;
    b) forming a first endplate and second endplate defining the ends of the upper chamber and the ends of the lower chamber;
    c) forming at least one mid-plate reflector having a plurality of openings;
    d) mounting the at least one mid-plate reflector to the first endplate and the second endplate within the upper fixture structure, thereby defining a floor of the upper chamber and a ceiling of the lower chamber;
    e) securing the at least one ballast within the upper chamber between a first cooling duct and a second cooling duct;
    f) mounting sockets to the first and second endplates in the lower chamber;
    g) installing at least one fluorescent lamp having two ends, such that each lamp end is secured by the sockets;
    h) sealingly securing at least one transparent glass sheet to the first and second end plates or upper fixture structure, such that the glass sheet provides a floor for the lower chamber;
    i) installing at least one fan in flow communication with either the first cooling duct, second cooling duct, or both; and
    j) connecting the ballast, fan, and at least one lamp to electrical power.

2. The method of claim 1 wherein the at least one mid-plate reflector has no openings above the lamp ends.

3. The method of claim 1 wherein the at least one ballast is secured such that the ballast is in thermal conduction with the upper fixture structure.

4. The method of claim 1 wherein the first endplate and second endplate each have a tab with through holes for easy hanging.

5. The method of claim 1 wherein the mid-plate reflector has a plurality of through openings in the shape of longitudinal slots, located above each lamp.

6. The method of claim 1 wherein a baffle is constructed and arranged to direct air flowing between the first cooling duct and the second cooling duct such that the directed air flows through the mid-plate reflector openings.

7. The method of claim 1 wherein a baffle is constructed and arranged to direct air flowing between the first cooling duct and the second cooling duct such that the directed air flows around the ballast.

8. The method of claim 1 wherein the at least one mid-plate reflector mounts to and within the upper fixture structure, thereby defining a floor of the upper chamber and a ceiling of the lower chamber.

* * * * *